US008238575B2

(12) United States Patent
Buck et al.

(10) Patent No.: US 8,238,575 B2
(45) Date of Patent: Aug. 7, 2012

(54) DETERMINATION OF THE COHERENCE OF AUDIO SIGNALS

(75) Inventors: Markus Buck, Biberach (DE); Timo Matheja, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 243 days.

(21) Appl. No.: 12/636,432

(22) Filed: Dec. 11, 2009

(65) Prior Publication Data

US 2010/0150375 A1 Jun. 17, 2010

(30) Foreign Application Priority Data

Dec. 12, 2008 (EP) .................................... 08021674

(51) Int. Cl.
*H04B 15/00* (2006.01)

(52) U.S. Cl. ..................... 381/94.1; 381/71.11; 704/226

(58) Field of Classification Search ................. 381/94.1, 381/71.8, 71.11, 71.1, 71.4, 71.12, 86, 122, 381/92, 313; 455/90, 73; 704/200, 226, 704/218
See application file for complete search history.

(56) References Cited

U.S. PATENT DOCUMENTS 5,680,337 A * 10/1997 Pedersen et al. .............. 708/322
7,788,066 B2 * 8/2010 Taenzer et al. ................ 702/191
2003/0147538 A1 * 8/2003 Elko ............................... 381/92
2004/0042626 A1 3/2004 Balan et al. ................... 381/110
2004/0111258 A1 6/2004 Zangi et al. ................... 704/226
2007/0005350 A1 1/2007 Amada ......................... 704/211

FOREIGN PATENT DOCUMENTS

WO WO 2005/029468 A1 3/2005

OTHER PUBLICATIONS

European Patent Office, Extended European Search Report; Application No. 08021674.0-1224; May 29, 2009.

* cited by examiner

*Primary Examiner* — Vivian Chin
*Assistant Examiner* — Con P Tran
(74) *Attorney, Agent, or Firm* — Sunstein Kann Murphy & Timbers LLP

(57) ABSTRACT

Embodiments of the invention disclose computer-implemented methods, systems, and computer program products for estimating signal coherence. First, a sound generated by a sound source is detected by a first microphone to obtain a first microphone signal and by a second microphone to obtain a second microphone signal. The first microphone signal is filtered by a first adaptive finite impulse response filter to obtain a first filtered signal. The second microphone signal is filtered by a second adaptive finite impulse response filter, to obtain a second filtered signal. The coherence of the first filtered signal and the second filtered signal is determined based upon the filtered signals. The first and the second microphone signals are filtered such that the difference between the acoustic transfer function for the transfer of the sound from the sound source to the first microphone and the transfer of the sound from the sound source to the second microphone is compensated in the first and second filtered signals.

26 Claims, 5 Drawing Sheets

DETERMINATION OF THE COHERENCE OF AUDIO SIGNALS

PRIORITY

The present U.S. Patent Application claims priority from European Patent Application No. 08021674.0 entitled, Determination of the Coherence of Audio Signals filed on Dec. 12, 2008, which is incorporated herein by reference in its entirety.

TECHNICAL FIELD

The present invention relates to the field of the electronic processing of audio signals, particularly, speech signal processing and, more particularly, it relates to the determination of signal coherence of microphone signals that can be used for the detection of speech activity.

BACKGROUND ART

Speech signal processing is an important issue in the context of present communication systems, for example, hands-free telephony and speech recognition and control by speech dialog systems, speech recognition means, etc. When audio signals that may or may not comprise speech at a given time frame are to be processed in the context of speech signal processing detection of speech is an essential step in the overall signal processing.

In the art of multi-channel speech signal processing, the determination of signal coherence of two or more signals detected by spaced apart microphones is commonly used for speech detection. Whereas speech represents a rather time-varying phenomenon due to the temporarily constant transfer functions that couple the speech inputs to the microphone channels spatial coherence for sound, in particular, a speech signal, detected by microphones located at different positions can, in principle, be determined. In the case of multiple microphones for each pair of microphones signal coherence can be determined and mapped to a numerical range from, 0 (no coherence) to 1 (maximum coherence), for example. While diffuse background noise exhibits almost no coherence a speech signal generated by a speaker usually exhibits a coherence close to 1.

However, in reverberating environments wherein a plurality of sound reflections are present, e.g., in a vehicular cabin, reliable estimation of signal coherence still poses a demanding problem. Due to the acoustic reflections the transfer functions describing the sound transfer from the mouth of a speaker to the microphones show a large number of nulls in the vicinity of which the phases of the transfer functions may discontinuously change. However, a consistent phase relation of the input signals of the microphones is crucial for the determination of signal coherence. If within a frequency band, wherein a relatively coarse spectral resolution of some 30 to 50 Hz is usually employed, a null is present, the phase in the same band may assume very different phase values.

Thus, in reality the phase relation of wanted signal portions of the microphone signals largely depends on the spectra of the input signals which is in marked contrast to the technical approach of estimating signal coherence by determining normalized signal correlations independently from the corresponding signal spectra. The usually employed coarse spectral resolution of some 30 to 50 Hz per frequency band, therefore, often causes relatively small coherence values even if speech is present in the audio signals under consideration and, thus, failure of speech detection, since background noise, e.g., driving noise in an automobile, gives raise to some finite "background coherence" that is comparable to small coherence values caused by the poor spectral resolution.

In the art, some temporal smoothing of the power of the detected signals by means of constant smoothing parameters is performed in an attempt to improve the reliability of speech detection based on signal coherence. However, conventional smoothing processing results in the suppression of fast temporal changes of the estimated coherence and, thus, unacceptable long reaction times during speech onsets and offsets or misdetection of speech during actual speech pauses.

Therefore, there is a need for an enhanced estimation of signal coherence, in particular, for the detection of speech in highly time-varying audio signals showing fast reaction times and robustness during speech pauses.

SUMMARY OF THE INVENTION

In a first embodiment of the invention there is provided a computer-implemented method for estimating signal coherence. First, a sound generated by a sound source is detected by a first microphone to obtain a first microphone signal and by a second microphone to obtain a second microphone signal. The first microphone signal is filtered by a first adaptive finite impulse response filter to obtain a first filtered signal. The second microphone signal is filtered by a second adaptive finite impulse response filter, to obtain a second filtered signal. The coherence of the first filtered signal and the second filtered signal is determined based upon the filtered signals. The first and the second microphone signals are filtered such that the difference between the acoustic transfer function for the transfer of the sound from the sound source to the first microphone and the transfer of the sound from the sound source to the second microphone is compensated in the first and second filtered signals.

In certain embodiments of the invention, the first filter models the transfer function of the sound from the sound source to the second microphone and the second filter models the transfer function of the sound from the sound source to the first microphone. In other embodiments of the invention, the first filter and the second filter are adapted such that an average power density of the error signal $E(e^{j\Omega_\mu},k)$ defined as the difference of the first and second filtered signals $Y_1(e^{j\Omega_\mu},k)$ and $Y_2(e^{j\Omega_\mu},k)$ is minimized. In still other embodiments of the invention, the first filter and the second filter are adapted by means of the Normalized Least Mean Square algorithm and depending on an estimate for the power density of background noise $\hat{S}_{bb}(\Omega_\mu,k)$ weighted by a frequency-dependent parameter.

The coherence may be estimated by calculating the short-time coherence of the first and second filtered signals $Y_1(e^{j\Omega_\mu},k)$ and $Y_2(e^{j\Omega_\mu},k)$. The calculation of the short-time coherence includes calculating the power density spectrum of the first filtered signal $Y_1(e^{j\Omega_\mu},k)$, the power density spectrum of the second filtered signal $Y_2(e^{j\Omega_\mu},k)$ and the cross-power density spectrum of the first and the second filtered signals $Y_1(e^{j\Omega_\mu},k)$ and $Y_2(e^{j\Omega_\mu},k)$ and temporarily smoothing each of these power density spectra. The temporal smoothing may be based on the signal to noise ratio. Thus, either the signal-to-noise ratio of first filtered signal $Y_1(e^{j\Omega_\mu},k)$ and/or the second filtered signal $Y_2(e^{j\Omega_\mu},k)$; or of the first microphone signal $x_1(t)$ and/or the second microphone signal $x_2(t)$ is determined. The temporal smoothing of each of the power density spectra is then performed based on a smoothing parameter that depends on the determined signal-to-noise ratio. In certain embodiments, the short-time coherence is determined in frequency to estimate the coherence. In other embodiments, a background short-time coherence is subtracted from the calculated short-time coherence to estimate the coherence. In yet other embodiments, the short-time coherence is temporally smoothed and the background short-time coherence is determined from the temporarily smoothed short-time coherence by minimum tracking.

In alternative embodiments of the invention, there may be two or more sound sources and the methodology discussed may be augmented by detecting sound generated by a first sound source and a different sound generated by a second source by the first and the second microphones. In such an embodiment one of the microphones is closer to the first sound source and one is closer to the second sound source. For example, the first microphone may be positioned closer to the first sound source than the second microphone and the second microphone is positioned closer to the second sound source than the first microphone. A first and a second adaptive filters are associated with the first sound source and likewise, another first and second adaptive filters are associated with the second sound source. The signal-to-noise ratio of the first and the second microphone signals $x_1(n)$ and $x_2(n)$ is determined. The first and second adaptive filters associated with the first sound source are determined without adapting the first and second adaptive filters associated with second sound source, if the signal-to-noise ratio of the first microphone signal exceeds a predetermined threshold and exceeds the signal-to-noise ratio of the second microphone signal by some predetermined factor. The first and second adaptive filters associated with the second sound source are also determined without adapting the first and second adaptive filters associated with first sound source, if the signal-to-noise ratio of the second microphone signal exceeds a predetermined threshold and exceeds the signal-to-noise ratio of the first microphone signal by some predetermined factor.

The methodology presented may be implemented in hardware, software or a combination of both. Additionally, the methodology may be embodied in a computer program product that includes a tangible computer readable medium with computer executable code thereon for executing the computer code representative of the methodology for determining signal coherence.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The disclosed methodology can be embodied in a computer system or other processing system or specialized digital processing system as computer code for operation with the computer system/processing system/specialized digital processing system. In particular, the methodology may be employed within a speech recognition system within an automobile or other enclosed location. The computer code can be adapted as logic (computer program logic or hardware logic). The hardware logic may take the form of an integrated circuit, (e.g. ASIC), or FPGA (fixed programmable gate array). The computer code may be embodied as a computer program product comprising a tangible computer readable medium that contains the computer code thereon. Thus, the methodology disclosed in the detailed description with the provided mathematical equations should be recognized by one of ordinary skill in the art as adaptable without undue experimentation into computer executable code. The computer code may be written in any computer language (e.g. C, C++, C#, Fortran etc.).

Figure 1:
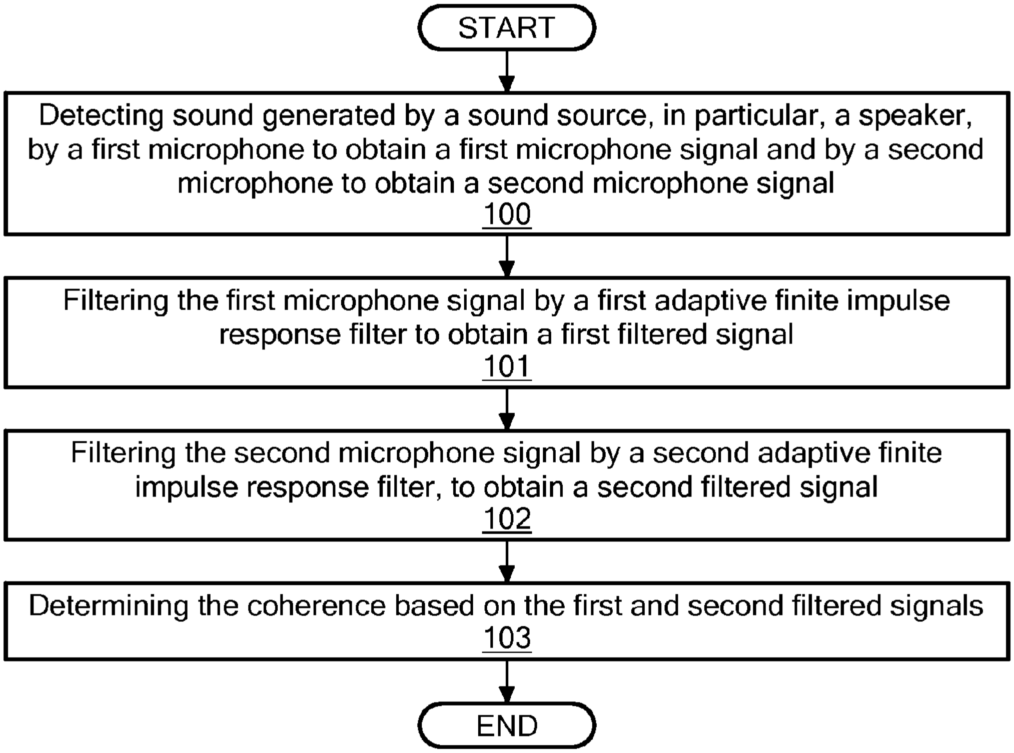
FIG. 1 is a flow chart of a first embodiment of the invention for determining signal coherence

As show in the flow chart of FIG. 1 signal coherence can be improved in a multi-microphone speech processing environment through the use of adaptive filters. For example in a two microphone system where the adaptive filters filter the microphone signals, the filters operate to filter the microphone signals such that the difference between the acoustic transfer function for the transfer of sound from the sound source to the first microphone and the transfer of the sound from the sound source to the second microphone is at least partly compensated.

The method operates by first detecting sound generated by a sound source, in particular, a speaker, by a first microphone to obtain a first microphone signal. 100 Similarly the sound source is detected by a second microphone to obtain a second microphone signal 101. The first microphone signal is filtered by a first adaptive filter which is an adaptive finite impulse response filter. 102. The first filter models the transfer function of the sound from the sound source to the second microphone. The second microphone signal is filtered by a second adaptive finite impulse response filter, to obtain a second filtered signal 103. The second filter models the transfer function of the sound from the sound source to the first microphone. The first and the second microphone signals are filtered such that the difference between the acoustic transfer function for the transfer of the sound from the sound source to the first microphone and the transfer of the sound from the sound source to the second microphone is compensated in the first and second filtered signals. This can be achieved in one way by adapting the first filter and the second filter such that an average power density of the error signal $E(e^{j\Omega_\mu},k)$ defined as the difference of the first and second filtered signals $Y_1(e^{j\Omega_\mu},k)$ and $Y_2(e^{j\Omega_\mu},k)$ is minimized. The coherence of the first filtered signal and the second filtered signal are estimated. 103.

It is straightforward to generalize the method to more than two microphone signals obtained by multiple microphones. In particular, the adaptive filtering comprised in this method compensates for a different transfer of sound from a sound source to the microphones. The filter coefficients of the adaptive filters are adaptable to account for time-varying inputs rather than being fixed coefficients. For each microphone an individual transfer function for the respective sound source—room—microphone system can be determined. Due to the different locations of the microphones the transfer functions (impulse responses) differ from each other. This difference is compensated by the adaptive filtering thereby significantly improving the coherence estimates (as explained below).

The transfer function can be represented as a z-transformed impulse response or in the frequency domain by applying a Discrete Fourier Transform to the impulse response.

In particular, the first filter may model the transfer function of the sound from the sound source to the second microphone and the second filter may model the transfer function of the sound from the sound source to the first microphone. After filtering of the first microphone signal by the thus adapted first filter and filtering of the second microphone signal by the thus adapted second filter the different transfer of sound to the respective microphones is largely eliminated and, thus, the estimate of coherence of the microphone signals is facilitated.

The coherence is a well known measure for the correlation of different signals. For two time-dependent signals x(t) and y(t) with the respective auto power density spectra $S_{xx}(f)$ and $S_{yy}(f)$ and the cross-power density spectrum $S_{xy}(f)$ (where t is the time index and f the frequency index of the continuous time-dependent signals) the coherence function $\Gamma_{xy}(f)$ is defined as $$\Gamma_{xy}(f) = \frac{S_{xy}(f)}{\sqrt{S_{xx}(f) \cdot S_{yy}(f)}}.$$

Thus, the coherence function $\Gamma_{xy}(f)$ represents a normalized cross-power density spectrum. Since, in general, the coherence function $\Gamma_{xy}(f)$ is complex-valued, the squared-magnitude is usually taken (magnitude squared coherence). In the following, the term "coherence", if not specified otherwise, may either denote coherence in terms of the coherence function $\Gamma_{xy}(f)$ or the magnitude squared coherence C(f), i.e.

$$C(f) = \frac{|S_{xy}(f)|^2}{S_{xx}(f) \cdot S_{yy}(f)}.$$

Complete correlation of the time-dependent signals x(t) and y(t) is given for C(f)=1.

Based on an improved estimate of signal coherence speech detection, for example, can be made more reliable than it was previously available in the art.

According to an embodiment the first filter and the second filter are adapted such that an average power density of the error signal $E(e^{j\Omega_\mu},k)$ defined as the difference of the first and second filtered signals $Y_1(e^{j\Omega_\mu},k)$ and $Y_2(e^{j\Omega_\mu},k)$ is minimized. An optimization criterion for the minimization can be defined as the Minimum Mean Square Error (MMSE) and the average can be regarded as a means value in the statistical sense. Alternatively, the Least Squares Error (LSE) criterion can be applied where the average corresponds to the sum of the squared error over some predetermined period of time.

Thus, the filter coefficients of the filters are adapted in a way to obtain comparable power densities of the filtered microphone signals, thereby, improving the reliability of the coherence estimate.

The processing of the microphone signals may be performed in the frequency domain or in the frequency sub-band regime rather than the time domain in order to save computational resources (see detailed description below). The microphone signals $x_1(n)$ and $x_2(n)$ are subject to Discrete Fourier transform or filtering by analysis filter banks for the further processing, in particular, by the adaptive filters. Accordingly, in the present invention, the coherence can be estimated by calculating the short-time coherence based on the adaptively filtered sub-band microphone signals or Fourier transformed microphone signals.

According to an example, the first filter and the second filter are adapted by means of the Normalized Least Mean Square algorithm and depending on an estimate for the power density of background noise $\hat{S}_{bb}(\Omega_\mu,k)$ weighted by a frequency-dependent parameter. The Normalized Least Mean Square algorithm proves to be a robust procedure for the adaptation of the filter coefficients of the first and second filter. Provided below is an exemplary realization of the adaptation of the filter coefficients.

As already mentioned above the coherence may be estimated by calculating the short-time coherence. In one embodiment of the herein disclosed method, the calculation of the short-time coherence comprises calculating the power density spectrum $S_{y_1y_1}(\Omega_\mu,k)$ of the first filtered signal $Y_1(e^{j\Omega_\mu},k)$, the power density spectrum $S_{y_2y_2}(\Omega_\mu,k)$ of the second filtered signal $Y_2(e^{j\Omega_\mu},k)$ and the cross-power density spectrum $S_{y_1y_2}(\Omega_\mu,k)$ of the first and the second filtered signals $Y_1(e^{j\Omega_\mu},k)$ and $Y_2(e^{j\Omega_\mu},k)$ and temporarily smoothing each of these three power density spectra. The power density spectra can be recursively smoothed by means of a constant smoothing constant. The short-time coherence can then be calculated by $$\hat{C}(\Omega_\mu, k) = \frac{|\hat{S}_{y_1y_2}(\Omega_\mu, k)|^2}{\hat{S}_{y_1y_1}(\Omega_\mu, k) \cdot \hat{S}_{y_2y_2}(\Omega_\mu, k)},$$

where the hat "^" denotes the smoothed spectra.

Figure 2:
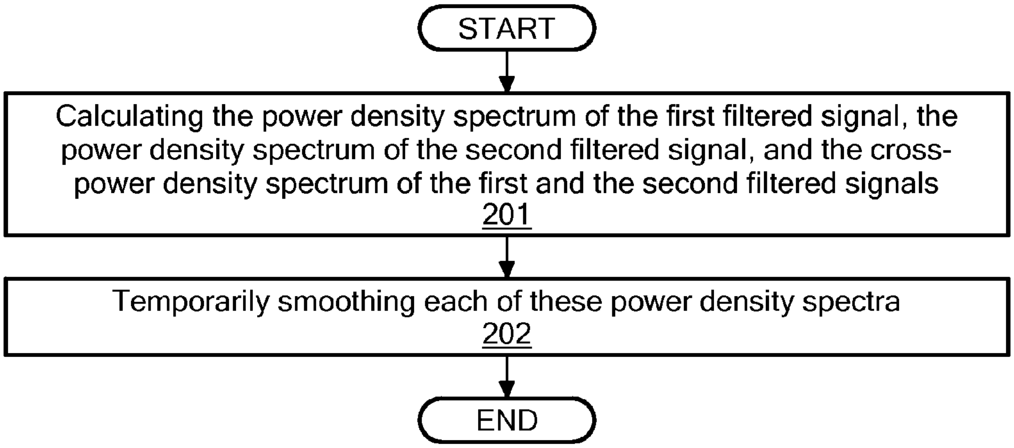
FIG. 2 is a flow chart of a second embodiment of the invention.

According to this embodiment as shown in the flow chart of FIG. 2, the method of FIG. 1 may be augmented by determining either the signal-to-noise ratio of first filtered signal $Y_1(e^{j\Omega_\mu},k)$ and/or the second filtered signal $Y_2(e^{j\Omega_\mu},k)$ or the first microphone signal $x_1(t)$ and/or the second microphone signal $x_2(t)$. 201. Temporal smoothing can then be accomplished by smoothing each of the power density spectra. This may be performed based on a smoothing parameter that depends on the determined signal-to-noise ratios. 202. The method may further comprise smoothing the short-time coherence calculated as described above in the frequency direction in order to estimate the coherence. By such a frequency smoothing the coherence estimates can be further improved. Smoothing can be performed in both the positive and the negative frequency directions.

As an example of another kind of post-processing, subtracting of a background short-time coherence from the calculated short-time coherence (or the calculated short-time coherence after frequency smoothing) may be performed. By determining a background short-time coherence some "artificial" coherence of diffuse noise portions of the microphone signals caused by reverberations of an acoustic room in that the microphones are installed, for example, a vehicle compartment can be taken into account. It is noted that diffuse noise portions may also be present due to ambient noise, in particular, driving noise in a vehicle compartment.

According to an example, temporarily smoothing of the short-time coherence is performed and the background short-time coherence is determined from the temporarily smoothed short-time coherence by minimum tracking/determination (see detailed description below).

Figure 3:
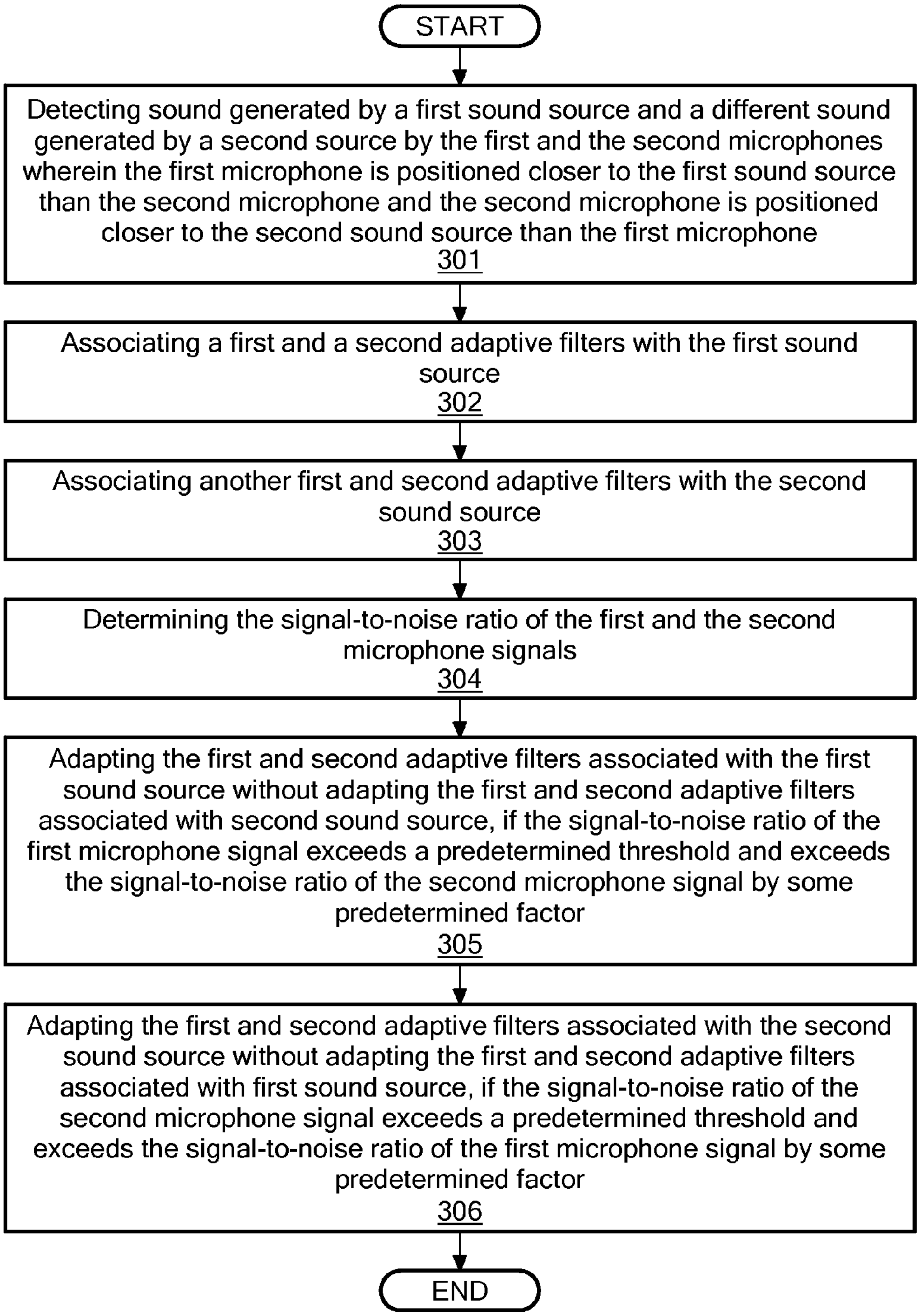
FIG. 3 is a flow chart that augments the flow chart of FIG. 1 where there are two sound sources.

The present invention can also advantageously be applied to situations in that more than one speaker is involved as shown in the flow chart of FIG. 3. In this case, for each individual speaker a separate filter structure is to be defined. A particular filter structure associated with one of the speakers is only to be adapted when no other speaker is speaking First sound generated by a first sound source and a different sound generated by a second source are detected by the first and the second microphones wherein the first microphone is positioned closer to the first sound source than the second microphone and the second microphone is positioned closer to the second sound source than the first microphone. 301 A first and a second adaptive filters are associated with the first sound source 302. Another first and second adaptive filters are associated with the second sound source 303. The signal-to-noise ratio of the first and the second microphone signals $x_1(n)$ and $x_2(n)$ are determined 304. The first and second adaptive filters associated with the first sound source are adapted without adapting the first and second adaptive filters associated with second sound source, if the signal-to-noise ratio of the first microphone signal exceeds a predetermined threshold and exceeds the signal-to-noise ratio of the second microphone signal by some predetermined factor 305. The first and second adaptive filters associated with the second sound source are adapted without adapting the first and second adaptive filters associated with first sound source, if the signal-to-noise ratio of the second microphone signal exceeds a predetermined threshold and exceeds the signal-to-noise ratio of the first microphone signal by some predetermined factor. 306. The coherence can then be determined 307.

The adaptation control can, for example, be realized by an adaptation parameter used in the adaptation of the filter coefficients of the first and second filter that assumes a finite value or zero depending on the determined signal-to-noise ratios. Thereby, false adaptation of a filter structure associated with a particular speaker in the case of utterances by another speaker is efficiently prevented.

It should be noted that in accordance with an aspect of the present invention it is also foreseen to improve the conventional procedure for estimating signal coherence by smoothing the conventionally obtained coherence (by temporal smoothing of the respective power density spectra) in frequency and/or by performing the conventionally done temporal smoothing of the respective power density spectra based on a smoothing parameter that depends on the signal-to-noise ratio as described above and/or by subtraction of minimum coherence as described above without the steps of adaptive filtering of the microphone signals to compensate for the different transfer functions.

All of the above-described examples of the method for estimating signal coherence can be used for speech detection. Speech detection can be performed based on the calculated short-time coherence. Speech recognition, speech control, machine-human speech dialogs, etc. can advantageously be performed based on detection of speech activity facilitated by the estimation of signal coherence as described in the above examples.

Figure 4:
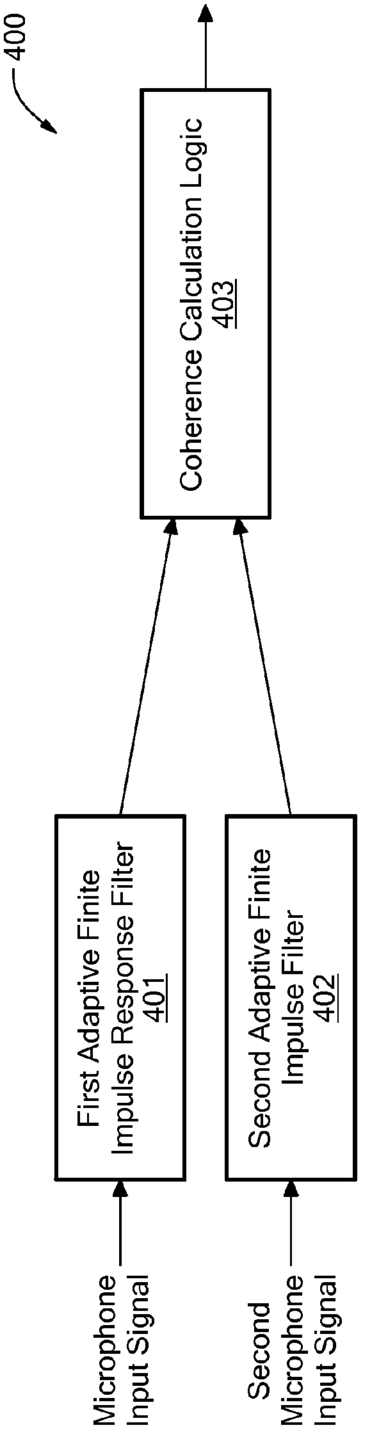
FIG. 4 is a diagram of a signal processing system for determining signal coherence.

FIG. 4 shows a signal processing system. The signal processing system may be implemented in a single integrated circuit or on multiple circuits (i.e. different circuit elements or processors or FPGAs). The signal processing system includes a first adaptive filter 401. The first adaptive filter may be a first adaptive Finite Impulse Response filter that is configured to filter a first microphone signal $x_1(n)$ to obtain a first filtered signal $Y_1(e^{j\Omega_\mu},k)$. The signal processing system may include a second adaptive filter 402. The second adaptive filter may be a Finite Impulse Response filter, configured to filter a second microphone signal $x_2(n)$ to obtain a second filtered signal $Y_2(e^{j\Omega_\mu},k)$. The system also includes coherence calculation logic 403 that is configured to estimate the coherence of the first filtered signal $Y_1(e^{j\Omega_\mu},k)$ and the second filtered signal $Y_2(e^{j\Omega_\mu},k)$. The first and the second adaptive filters are configured to filter the first and the second microphone signals $x_1(n)$ and $x_2(n)$ such that the difference between the acoustic transfer function for the transfer of the sound from a sound source to the first microphone and the transfer of the sound from the sound source to the second microphone is compensated in the first and second filtered signals $Y_1(e^{j\Omega_\mu},k)$ and $Y_2(e^{j\Omega_\mu},k)$. In particular, the signal processing system can be configured to carry out the steps described in the example provided herein of the inventive method for estimating signal coherence.

More particularly, the coherence calculation means can be configured to calculate the short-time coherence of the first and second filtered signals $Y_1(e^{j\Omega_\mu},k)$ and $Y_2(e^{j\Omega_\mu},k)$ and wherein the first and second filters are configured to be adapted by means of the Normalized Least Mean Square algorithm and depending on an estimate for the power density of background noise $\hat{S}_{bb}(\Omega_\mu,k)$ weighted by a frequency-dependent parameter.

The present invention can advantageously be applied in communication systems (e.g. a hands-free speech communication device, in particular, a hands-free telephony set, and more particularly suitable for installation in a vehicle (automobile) compartment).

As described above, the present invention is related to improved estimation of signal coherence. The coherence of two signals x(t) and y(t) can be defined by the coherence function $\Gamma_{xy}(f)$ or the magnitude squared coherence C(f), i.e.

$$C(f) = \frac{|S_{xy}(f)|^2}{S_{xx}(f) \cdot S_{yy}(f)},$$

where the power density spectra of the signals x(t), y(t) and the cross power density spectrum are denoted by $S_{xx}(t)$, $S_{yy}(t)$, $S_{xy}(t)$, respectively.

However, in practical applications sampled time-discrete microphone signals are available rather than continuous time-dependent signals and, furthermore, the sound field, in general, exhibits time-varying statistical characteristics. During actual real-time processing, therefore, the coherence is calculated on the basis of previous signals. For this, the time-dependent signals that are sampled in time frames are transformed in the frequency domain (or, alternatively, in the sub-band regime). In the sub-band regime/frequency domain, the respective power density spectra are estimated and the short-time coherence is calculated.

In detail, the signals x(n) and (y(n), where n denotes the discrete time index of the signals sampled with some sampling rate $f_A$ (e.g., $f_A$=11025 Hz), are divided into overlapping segments and transformed into the frequency domain by a Discrete Fourier Transform (DFT) or in the sub-band regime by an analysis filter bank as it is known in the art, in order to obtain the signals $X(e^{j\Omega_\mu},k)$ and $Y(e^{j\Omega_\mu},k)$ with the frequency index μ and the frequency interpolation points $\Omega_\mu$ of the DFT with some length $N_{DFT}$ (e.g., $N_{DFT}$=256) or the frequency sub-band $\Omega_\mu$, respectively. The frame shift of the signal frames is given by R sampling values (e.g., R=64). After down-sampling of the input signals (sampled at n) the discrete time index shall be denoted by k.

Temporal averaging of the short-time power density spectra $S_{xx}(\Omega_\mu,k)=|X(e^{j\Omega_\mu},k)|^2$, $S_{yy}(\Omega_\mu,k)=|Y(e^{j\Omega_\mu},k)|^2$ and $S_{xy}(\Omega_\mu,k)=X^*(e^{j\Omega_\mu},k)Y(e^{j\Omega_\mu},k)$ allows for continuous estimation of the short-time coherence. For example, the temporal averaging may be recursively performed by means of a smoothing constant $\beta_t$ according to $$\hat{S}_{xx}(\Omega_\mu,k)=\beta_t\cdot\hat{S}_{xx}(\Omega_\mu,k-1)+(1-\beta_t)\cdot|X(e^{j\Omega_\mu},k)|^2,$$

$$\hat{S}_{yy}(\Omega_\mu,k)=\beta_t\cdot\hat{S}_{yy}(\Omega_\mu,k-1)+(1-\beta_t)\cdot|Y(e^{j\Omega_\mu},k)|^2$$

and $$\hat{S}_{xy}(\Omega_\mu,k)=\beta_t\cdot\hat{S}_{xy}(\Omega_\mu,k-1)+(1-\beta_t)\cdot X^*(e^{j\Omega_\mu},k)Y(e^{j\Omega_\mu},k),$$

where the asterisk denotes the complex conjugate. A suitable choice for the smoothing constant is $\beta_t=0.5$, for example.

Thus, the short-time coherence $\hat{C}$ can be obtained by $$\hat{C}(\Omega_\mu,k)=\frac{|\hat{S}_{xy}(\Omega_\mu,k)|^2}{\hat{S}_{xx}(\Omega_\mu,k)\cdot\hat{S}_{yy}(\Omega_\mu,k)}.$$

The estimate of signal coherence can be improved with respect to the estimation by the above formula by post-processing in form of smoothing in frequency direction. In fact, it has been proven that more reliable coherence estimates result from a smoothing of the short-time coherence $\hat{C}$ calculated above according to $$\hat{C}'(\Omega_\mu,k)=\beta_f\cdot\hat{C}'(\Omega_{\mu-1},k)+(1-\beta_f)\cdot\hat{C}(\Omega_\mu,k),$$

$$\hat{C}^f(\Omega_\mu,k)=\beta_f\cdot\hat{C}^f(\Omega_{\mu+1},k)+(1-\beta_f)\cdot\hat{C}'(\Omega_\mu,k),$$

i.e., smoothing by means of the smoothing constant $\beta_f$ in both the positive and negative frequency directions.

The conventionally performed estimation of signal coherence in form of the short-time coherence $\hat{C}$ can be further improved (in addition to or alternatively to the smoothing of $\hat{C}$ in the frequency direction) by modifying the conventional smoothing of the power density spectra in time as described above. In principle, strong smoothing (a large smoothing constant $\beta_t$) results in a rather slow declination of the power spectra when the signal power quickly declines at the end of an utterance. This implies that correct estimation of the power spectra can only be expected after some significant time period following the end of the utterance. During this time period the latest results are maintained whereas, in fact, a speech pause is present. In order to avoid this kind of malfunction it is desirable to only weakly smooth the power spectra during speech detected with a high signal-to-noise ratio (SNR). During intervals of no speech or speech embedded in heavy noise, stronger smoothing shall advantageously be performed. This can be realized by controlling the smoothing constant $\beta_t$ depending on the SNR, e.g., according to $$\beta_t(\Omega_\mu,k)=\begin{cases}\beta_{t,max}, & \text{if } SNR(\Omega_\mu,k)<Q_l\\ \frac{Q_h-10\log_{10}(SNR(\Omega_\mu,k))}{Q_h-Q_l}(\beta_{t,max}-\beta_{t,min})+\beta_{t,min}, & \text{if } Q_l\le SNR(\Omega_\mu,k)\le Q_h\\ \beta_{t,min}, & \text{if } SNR(\Omega_\mu,k)>Q_h\end{cases}$$

where suitable choices for the extreme values of the smoothing constant $\beta_t$ are $\beta_{t,min}=0.3$ and $\beta_{t,max}=0.6$ and the thresholds can be chosen as $10\log_{10}(Q_l)=0$ dB and $10\log_{10}(Q_h)=20$ dB, for example.

The conventionally estimated coherence can further be improved (in addition to or alternatively to the smoothing of $\hat{C}$ in the frequency direction and the noise dependent control of the smoothing constant $\beta_t$) by taking into account some artificial background coherence that is present in an acoustic room exhibiting relatively strong reverberations wherein the microphones are installed and the sound source is located. In a vehicle compartment, e.g., even during speech pauses and particularly in the low-frequency range a permanent relatively high background coherence caused by reverberations of diffuse noise is present and affects correct signal coherence due to speech activity of the passengers. Thus, it is advantageous to estimate the background (short-time) coherence and to subtract it from the estimate for the coherence obtained according to one of the above-described examples.

According to an example, the obtained short-time coherence is smoothed in the time direction (indexed by the discrete time index k) by means of a smoothing constant $\alpha_t$ according to $$\hat{C}^t(\Omega_\mu,k)=\alpha_t\cdot\hat{C}^t(\Omega_\mu,k-1)+(1-\alpha_t)\cdot\hat{C}(\Omega_\mu,k).$$

The background short-time coherence $\hat{C}^{min}$ can be estimated by minimum tracking according to $$\hat{C}^{min}(\Omega_\mu,k)=\min\{\beta_{over}\cdot\hat{C}^t(\Omega_\mu,k),\hat{C}^{min}(\Omega_\mu,k-1)\}\cdot(1+\epsilon),$$

where the overestimate factor $\beta_{over}$ is used for correctly estimating the background short-time coherence. By normalization an improved estimate for the short-time coherence as compared to the art can be obtained by $$\hat{C}^{norm}(\Omega_\mu,k)=\frac{\hat{C}(\Omega_\mu,k)-\hat{C}^{min}(\Omega_\mu,k)}{1-\hat{C}^{min}(\Omega_\mu,k)},$$

wherein the normalization by $1-\hat{C}^{min}(\Omega_\mu,k)$ restricts the range of values that can be assumed to $\hat{C}^{norm}(\Omega_\mu,k)\in[0,1]$.

Suitable choices for the above used parameters are $\alpha_t=0.5$, $\epsilon=0.01$ and $\beta_{over}=2$, for example.

Figure 5:
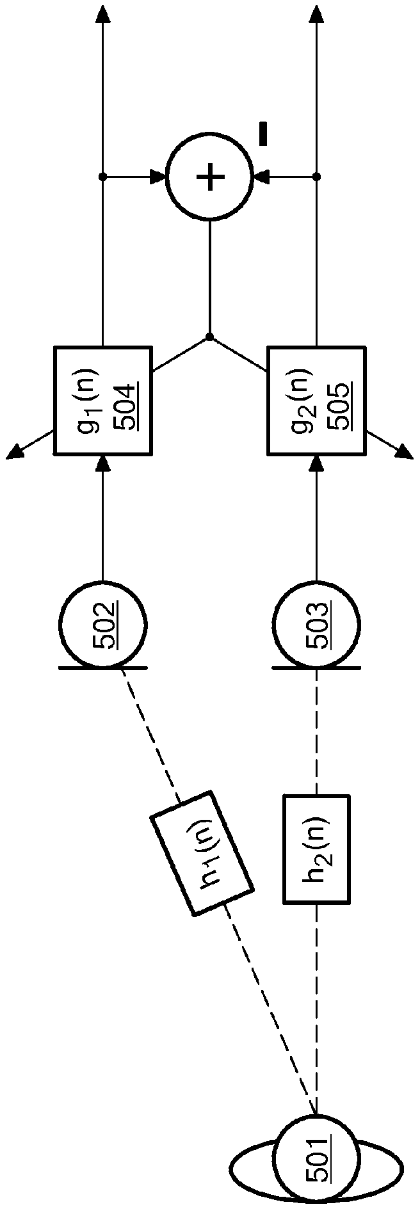
FIG. 5 illustrates the influence of different sound transfers from a sound source to spaced apart microphones on the estimation of signal coherence and employment of adaptive filters according to an example of the present invention.

In the example shown in FIG. 5, utterances by a speaker 501 are detected by a first and a second microphone 502, 503. The microphones 502, 503 are spaced apart from each other and, consequently, the sound travelling path from the speaker's 501 mouth to the first microphone 502 is different from the one to the second microphone 503.

Therefore, the transfer function $h_1(n)$ (impulse response) in the speaker-room-first microphone system is different from the transfer function $h_2(n)$ (impulse response) in the speaker-room-second microphone system. The different transfer functions cause problems in estimating the coherence of a first microphone signal obtained by the first microphone 502 and a second microphone signal obtained by the second microphone 503.

In order to compensate for the difference between $h_1(n)$ and $h_2(n)$ the first microphone signal is filtered by a first adaptive filters 504 and the second microphone signal is filtered by a second adaptive filters 505 wherein the filter coefficients of the first adaptive filters 504 is adapted in order to model the transfer function $h_2(n)$ and the second adaptive filters 505 is adapted in order to model the transfer function $h_1(n)$. Ideally, the impulse responses of the adaptive filters are adapted to achieve $g_1(n)=h_2(n)$ and $g_2(n)=h_1(n)$. In this case, the (short-time) coherence of the filtered microphone signals shall assume values close to 501 in the case of speech activity of the speaker 501. In particular, the filters can compensate for differences in the signal transit time of sound from the speaker's mouth to the first and second microphones 502 and 503, respectively. Thereby, it can be guaranteed that the signal portions that are directly associated with utterances coming from the speaker's 501 mouth can be estimated for coherence in the different microphone channels in the same time frames.

Figure 6:
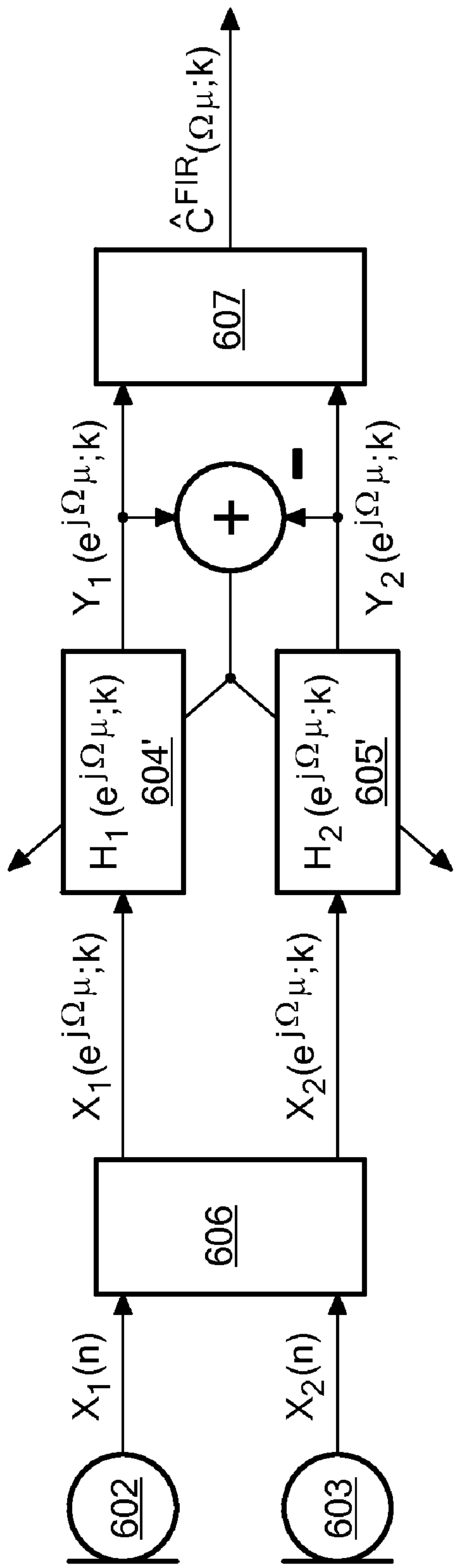
FIG. 6 illustrates an example of the inventive method for signal coherence comprising the employment of first and second adaptive filters.

In FIG. 6 an example employing two adaptive filters is shown wherein the signal processing is performed in the frequency sub-band regime. Whereas in the following processing in the sub-band regime is described, processing in the time domain may alternatively be performed. A first microphone signal $x_1(n)$ obtained by a first microphone 602 and a second microphone signal $x_2(n)$ obtained by a second microphone 603 are divided into respective sub-band signals $X_1(e^{j\Omega_\mu},k)$ and $X_2(e^{j\Omega_\mu},k)$ by an analysis filter bank 606. The sub-bands are denoted by $\Omega_\mu$, $\mu=0, \ldots, M-1$, wherein M is the number of the sub-bands into which the microphone signals are divided; k denotes the discrete time index for the down-sampled sub-band signals.

The sub-band signals $X_1(e^{j\Omega_\mu},k)$ and $X_2(e^{j\Omega_\mu},k)$ are input in respective adaptive filters that are advantageously chosen as Finite Impulse Response filters, 604' and 605'. As described with reference to FIG. 5 the filters 604' and 605' (504,505) are employed to compensate for the different transfer functions for sound traveling from a speaker's mouth (or more generally from a source sound) to the first and second microphones 602, 603. The filtered sub-band signals $Y_1(e^{j\Omega_\mu},k)$ and $Y_2(e^{j\Omega_\mu},k)$ are input in a coherence calculation means 607 that carries out calculation of the short-time coherence of the sub-band signals $Y_1(e^{j\Omega_\mu},k)$ and $Y_2(e^{j\Omega_\mu},k)$ according to one of the above-described examples.

According to the example shown in FIG. 6, the employed FIR filters comprise L complex-valued filter coefficients $H_{m,1}(e^{j\Omega_\mu},k)$, i.e. for each channel, e.g., $m \in \{1, 2\}: H_m(e^{j\Omega_\mu},k)=[H_{m,0}(e^{j\Omega_\mu},k), \ldots, H_{m,L-1}(e^{j\Omega_\mu},k)]^T$ for filtering sub-band signals (or the Fourier transformed microphone signals in case of processing in the frequency domain) $X_m(e^{j\Omega_\mu},k)=[X_m(e^{j\Omega_\mu},k), \ldots, X_m(e^{j\Omega_\mu},k-L+1)]^T$ where the upper index T denotes the transposition operation, m denotes the microphones (e.g., m=1, 2) and the filter length is given by L. The filtered signal is obtained by $Y_m(e^{j\Omega_\mu},k)=H^H_m(e^{j\Omega_\mu},k)\, X_m(e^{j\Omega_\mu},k)$, where the upper index H denotes the Hermetian of H (complex-conjugated and transposed). In the case of two microphone signals the error signal $E(e^{j\Omega_\mu},k)$ is given by $E(e^{j\Omega_\mu},k)=Y_1(e^{j\Omega_\mu},k)-Y_2(e^{j\Omega_\mu},k)$.

FIG. 6 illustrates the process of adaptive filtering of the sub-band signals $X_1(e^{j\Omega_\mu},k)$ and $X_2(e^{j\Omega_\mu},k)$ obtained by dividing the microphone signals $x_1(n)$ and $x_2(n)$ into sub-band signals by means of an analysis filter bank 606. Adaptive filtering of the sub-band signals $X_1(e^{j\Omega_\mu},k)$ and $X_2(e^{j\Omega_\mu},k)$ is performed based on the Normalized Least Mean Square (NLMS) algorithm that is well known to the skilled person. In a first adaptation step it is determined $$\tilde{H}_1(e^{j\Omega_\mu}, k+1) = H_1(e^{j\Omega_\mu}, k) - \gamma(\Omega_\mu, k)\frac{X_1(e^{j\Omega_\mu}, k)E^*(e^{j\Omega_\mu}, k)}{X_1^H(e^{j\Omega_\mu}, k)X_1(e^{j\Omega_\mu}, k) + \Delta(\Omega_\mu, k)}$$

and $$\tilde{H}_2(e^{j\Omega_\mu}, k+1) = H_2(e^{j\Omega_\mu}, k) + \gamma(\Omega_\mu, k)\frac{X_2(e^{j\Omega_\mu}, k)E^*(e^{j\Omega_\mu}, k)}{X_2^H(e^{j\Omega_\mu}, k)X_2(e^{j\Omega_\mu}, k) + \Delta(\Omega_\mu, k)}.$$

The step size of the adaptation is denoted by $\gamma(\Omega_\mu,k)$ and is chosen from the interval [0, 1]. Adaptation is, furthermore, controlled by $\Delta(\Omega_\mu,k)=\hat{S}_{bb}(\Omega_\mu,k)K_0$, where $\hat{S}_{bb}(\Omega_\mu,k)$ is an estimate for the noise power density and $K_0$ is some predetermined weight factor. It should be noted that in many applications, e.g., in a vehicle compartment, the noise and, thus, the signal-to-noise ratio (SNR) significantly depends on frequency. For example, the SNR may be higher for relatively high frequencies. Thus, it might be preferred to choose a frequency-dependent parameter $K_0(\Omega)$.

According to an example, $K_0$ may assume a minimum value, e.g., a value of $K_{min}=10$, in a first frequency range, e.g., from 0 to 1300 Hz, may linearly increase to a maximum value, e.g., $K_{max}=100$, in a second frequency range, e.g., from 1300 Hz to 4800 Hz, and may assume the maximum value $K_{max}$ up to some upper frequency limit, e.g., 5500 Hz.

In a second adaptation step the results of the first adaptation step are normalized according to $$H_m(e^{j\Omega_\mu}, k+1) = \frac{\tilde{H}_m(e^{j\Omega_\mu}, k+1)}{\sqrt{\tilde{H}_1^H(e^{j\Omega_\mu}, k+1)\tilde{H}_1(e^{j\Omega_\mu}, k+1) + \tilde{H}_2^H(e^{j\Omega_\mu}, k+1)\tilde{H}_2(e^{j\Omega_\mu}, k+1)}}.$$

As shown in FIG. 6 the thus adaptively filtered sub-band signals $Y_1(e^{j\Omega_\mu},k)=H^H_1(e^{j\Omega_\mu},k)X_1(e^{j\Omega_\mu},k)$, and $Y_2(e^{j\Omega_\mu},k)=H^H_2(e^{j\Omega_\mu},k)X_2(e^{j\Omega_\mu},k)$ are input in a coherence calculation processor 607 to obtain $$\hat{C}^{FIR}(\Omega_\mu, k) = \frac{|\hat{S}_{y_1y_2}(\Omega_\mu, k)|^2}{\hat{S}_{y_1y_1}(\Omega_\mu, k)\cdot\hat{S}_{y_2y_2}(\Omega_\mu, k)},$$

where the upper index FIR denotes the short-time coherence after FIR filtering of the sub-band signals by means of the adaptive filters 604' and 605'. Here, the power density spectra can be obtained according to the above-described recursive algorithm including the smoothing constant $\beta_t$ and with $Y_1(e^{j\Omega_\mu},k)$ and $Y_2(e^{j\Omega_\mu},k)$ as input signals. The smoothing in frequency, temporal smoothing and subtraction of a minimum coherence as described above can be employed in any combination together with the employment of the adaptive filters 604' and 605' and the adaptation of these means by the NLMS algorithm.

The inventive method for the estimation of signal coherence can be advantageously used for different signal processing applications. For example, the herein disclosed method for the estimation of signal coherence can be used in the design of superdirective beamformers, post-filtering in beamforming in order to suppress diffuse sound portions, in echo compensation, in particular, the detection of counter speech in the context of telephony, particularly, by means of hands-free sets, noise compensation with differential microphones, etc.

As already stated above the adaptive filters employed in the present invention model the transfer (paths) between a speaker (speaking person) and the microphones. This implies that the adaptation of these filters depends on the spatial position of the speaker. If signal coherence is to be estimated for multiple speakers, it is mandatory to assign a filter structure to each speaker individually such that the correct and optimized coherence can be estimated for each speaker.

Figure 7:
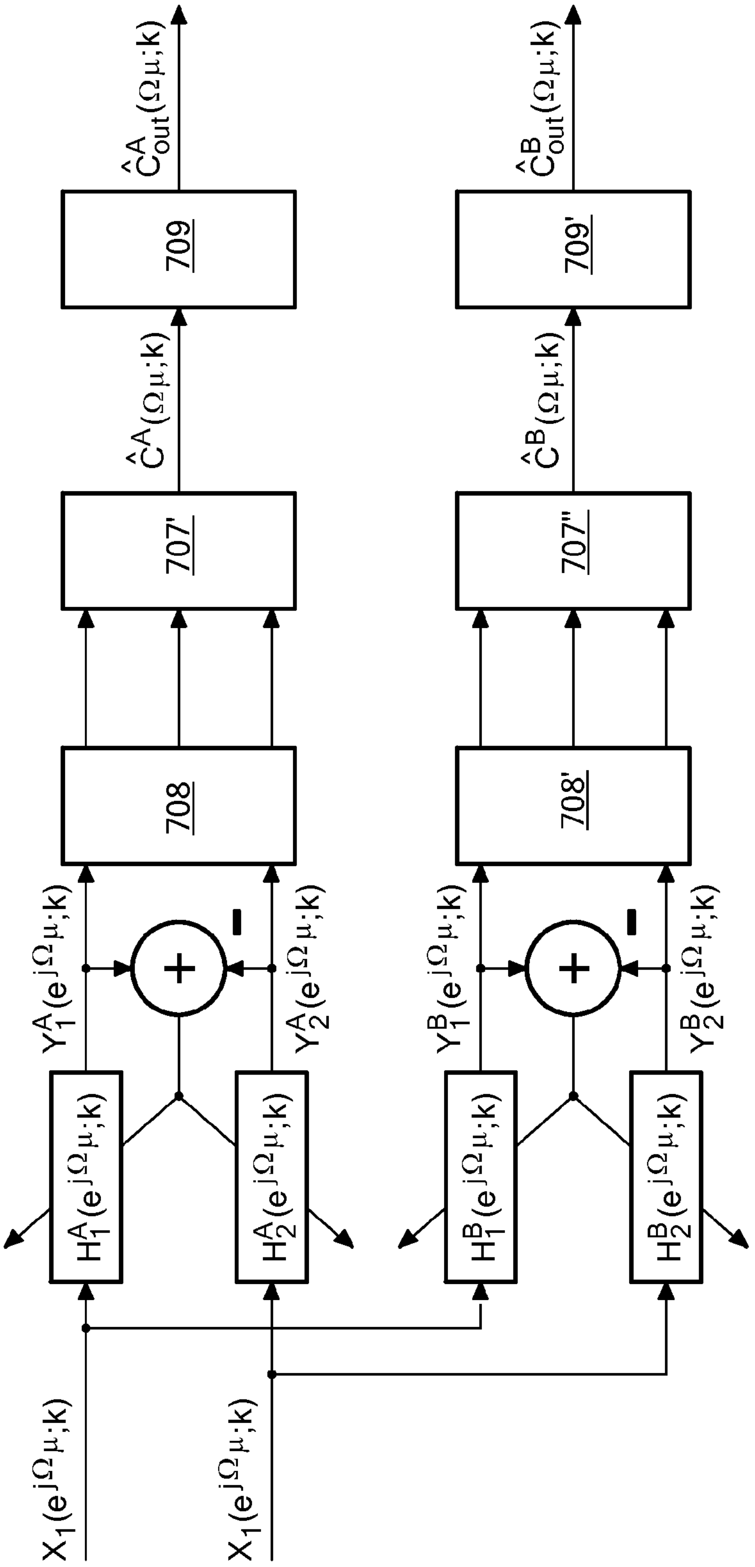
FIG. 7 illustrates an example of the inventive method for signal coherence adapted for estimating signal coherence for multiple speakers.

For example, if in the case of a hands-free set comprising two microphones installed in an automobile, both the driver and the front passenger shall be considered for speech signal processing, the above-described filter structure and the coherence estimation processing have to be duplicated as it is illustrated in FIG. 7. For each speaker a separate filter structure is provided and an adaptation control has to be provided that controls that adaptation of a particular filter structure is only performed when the associated speaker is active, i.e. when audio/speech signals detected by the microphones are, in fact, generated by this particular speaker, and when the signals exhibit a relatively high SNR.

In the case that more than one speaker, e.g., two speakers, are active, in the process of adaptation of the filter structure ($H^A_1(e^{j\Omega_\mu},k), H^A_2(e^{j\Omega_\mu},k)$) associated with the speaker A (cf. upper indices in FIG. 7), the signal contribution due to an utterance of the other speaker (speaker B) is considered as a perturbation and might be suppressed before adaptation. In this context, it might be advantageous to employ beamforming in order to determine the angle of incidence of sound detected by the microphones that are, e.g., arranged in a microphone array and may comprise directional microphones. In a situation of more than one active speaker being present at the same time it might be preferred not to adapt one of the filter structures at all. In any case, at a given point/period of time one of the filter structures only is allowed to be adapted according to the above-described procedures.

According to an example, the adaptation control can be realized as follows (see FIG. 7). The sub-band microphone signals $X_1(e^{j\Omega_\mu},k)$ and $X_2(e^{j\Omega_\mu},k)$ are input in a first filter structure comprising $H^A_1(e^{j\Omega_\mu},k)$ and $H^A_2(e^{j\Omega_\mu},k)$ and in a second filter structure comprising $H^B_1(e^{j\Omega_\mu},k)$ and $H^B_2(e^{j\Omega_\mu},k)$. The values of the SNR are determined for the sub-band microphone signals, i.e. $SNR_1(\Omega_\mu,k)$ for $X_1(e^{j\Omega_\mu},k)$ and $SNR_2(\Omega_\mu,k)$ for $X_2(e^{j\Omega_\mu},k)$, by processor 708 and 708', respectively. When the microphone outputting the microphone signal $x_1(t)$ that subsequently is divided into the sub-band signal $X_1(e^{j\Omega_\mu},k)$ is positioned, e.g., in a vehicle compartment, relatively far away from the microphone outputting the microphone signal $x_2(t)$ that subsequently is divided into the sub-band signals $X_2(e^{j\Omega_\mu},k)$, $SNR_1(\Omega_\mu,k)$ and $SNR_2(\Omega_\mu,k)$ shall significantly differ from each other, if only one speaker is active.

Accordingly, in the example shown in FIG. 7 the adaptation step size can be controlled for the estimation of the short-time coherences ($\hat{C}^A(\Omega_\mu,k)$ and $\hat{C}^B(\Omega_\mu,k)$) in filter structures A and B, respectively, as follows $$\gamma_A(\Omega_\mu, k) = \begin{cases} \gamma_0, & \text{if } (SNR_1(\Omega_\mu, k) > K_1) \wedge (SNR_1(\Omega_\mu, k) > K_2 SNR_2(\Omega_\mu, k)) \\ 0, & \text{else} \end{cases}$$

and $$\gamma_B(\Omega_\mu, k) = \begin{cases} \gamma_0, & \text{if } (SNR_2(\Omega_\mu, k) > K_1) \wedge (SNR_2(\Omega_\mu, k) > K_2 SNR_1(\Omega_\mu, k)) \\ 0, & \text{else} \end{cases}$$

where suitable choices for the employed parameters are $\gamma_0=0.5$, $K_1=4$ and $K_2=2$, for example. The thus adaptively filtered signals are input in coherence calculation processor 707', 707" that output the short-term coherence $$\hat{C}^A(\Omega_\mu, k) = \frac{\left|\hat{S}^A_{y_1 y_2}(\Omega_\mu, k)\right|^2}{\hat{S}^A_{y_1 y_1}(\Omega_\mu, k) \cdot \hat{S}^A_{y_2 y_2}(\Omega_\mu, k)}$$

or $$\hat{C}^B(\Omega_\mu, k) = \frac{\left|\hat{S}^B_{y_1 y_2}(\Omega_\mu, k)\right|^2}{\hat{S}^B_{y_1 y_1}(\Omega_\mu, k) \cdot \hat{S}^B_{y_2 y_2}(\Omega_\mu, k)}.$$

Thus obtained short-time coherence can be processed in post-processing means 709, 709' by smoothing in the frequency direction and/or subtraction of a minimum short-time coherence as described above.

All previously discussed embodiments are not intended as limitations but serve as examples illustrating features and advantages of the invention. It is to be understood that some or all of the above described features can also be combined in different ways.

The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable storage medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A computer-implemented method for estimating signal coherence, comprising:

detecting sound generated by a sound source, in particular, a speaker, by a first microphone to obtain a first microphone signal and by a second microphone to obtain a second microphone signal;

filtering the first microphone signal by a first adaptive finite impulse response filter to obtain a first filtered signal;

filtering the second microphone signal by a second adaptive finite impulse response filter, to obtain a second filtered signal; and estimating the coherence of the first filtered signal and the second filtered signal;

wherein the first and the second microphone signals being filtered such that the difference between the acoustic transfer function for the transfer of the sound from the sound source to the first microphone and the transfer of the sound from the sound source to the second microphone is compensated in the first and second filtered signals.

2. The method according to claim 1, wherein the first filter models the transfer function of the sound from the sound source to the second microphone and the second filter models the transfer function of the sound from the sound source to the first microphone.

3. The method according to claim 1, wherein the first filter and the second filter are adapted such that an average power density of the error signal $E(e^{j\Omega_\mu},k)$ defined as the difference of the first and second filtered signals $Y_1(e^{j\Omega_\mu},k)$ and $Y_2(e^{j\Omega_\mu},k)$ is minimized.

4. The method according to claim 1, wherein the first filter and the second filter are adapted by means of the Normalized Least Mean Square algorithm and depending on an estimate for the power density of background noise $\hat{S}_{bb}(\Omega_\mu,k)$ weighted by a frequency-dependent parameter.

5. The method according to claim 1, wherein the coherence is estimated by calculating the short-time coherence of the first and second filtered signals $Y_1(e^{j\Omega_\mu},k)$ and $Y_2(e^{j\Omega_\mu},k)$.

6. The method according to claim 5, wherein the calculation of the short-time coherence comprises:

calculating the power density spectrum of the first filtered signal $Y_1(e^{j\Omega_\mu},k)$, the power density spectrum of the second filtered signal $Y_2(e^{j\Omega_\mu},k)$ and the cross-power density spectrum of the first and the second filtered signals $Y_1(e^{j\Omega_\mu},k)$; and $Y_2(e^{j\Omega_\mu},k)$ and temporarily smoothing each of these power density spectra.

7. The method according to claim 6, further comprising determining either the signal-to-noise ratio of first filtered signal $Y_1(e^{j\Omega_\mu},k)$ and/or the second filtered signal $Y_2(e^{j\Omega_\mu},k)$; or of the first microphone signal $x_1(t)$ and/or the second microphone signal $x_2(t)$; and wherein the temporal smoothing of each of the power density spectra is performed based on a smoothing parameter that depends on the determined signal-to-noise ratio.

8. The method according to claim 5, further comprising:

smoothing the short-time coherence in frequency to estimate the coherence.

9. The method according to claims 5, further comprising:

subtracting a background short-time coherence from the calculated short-time coherence to estimate the coherence.

10. The method according to claim 9, further comprising:

temporarily smoothing the short-time coherence and wherein the background short-time coherence is determined from the temporarily smoothed short-time coherence by minimum tracking.

11. The method according to claim 5, comprising:

detecting sound generated by a first sound source and a different sound generated by a second source by the first and the second microphones wherein the first microphone is positioned closer to the first sound source than the second microphone and the second microphone is positioned closer to the second sound source than the first microphone;

associating the first and the second adaptive filters with the first sound source;

associating another first and second adaptive filters with the second sound source;

determining the signal-to-noise ratio of the first and the second microphone signals $x_1(n)$ and $x_2(n)$;

adapting the first and second adaptive filters associated with the first sound source without adapting the first and second adaptive filters associated with second sound source, if the signal-to-noise ratio of the first microphone signal exceeds a predetermined threshold and exceeds the signal-to-noise ratio of the second microphone signal by some predetermined factor; and adapting the first and second adaptive filters associated with the second sound source without adapting the first and second adaptive filters associated with first sound source, if the signal-to-noise ratio of the second microphone signal exceeds a predetermined threshold and exceeds the signal-to-noise ratio of the first microphone signal by some predetermined factor.

12. A computer program product comprising a nontransitory computer readable medium having computer code thereon for estimating signal coherence, the computer code comprising:

computer code for detecting sound generated by a sound source, in particular, a speaker, by a first microphone to obtain a first microphone signal and by a second microphone to obtain a second microphone signal;

computer code for filtering the first microphone signal by a first adaptive finite impulse response filter to obtain a first filtered signal;

computer code for filtering the second microphone signal by a second adaptive finite impulse response filter, to obtain a second filtered signal; and computer code for estimating the coherence of the first filtered signal and the second filtered signal; wherein the first and the second microphone signals being filtered such that the difference between the acoustic transfer function for the transfer of the sound from the sound source to the first microphone and the transfer of the sound from the sound source to the second microphone is compensated in the first and second filtered signals.

13. The computer program product according to claim 12, wherein the first filter models the transfer function of the sound from the sound source to the second microphone and the second filter models the transfer function of the sound from the sound source to the first microphone.

14. The computer program product according to claim 12, wherein the first filter and the second filter are adapted such that an average power density of the error signal $E(e^{j\Omega_\mu},k)$ defined as the difference of the first and second filtered signals $Y_1(e^{j\Omega_\mu},k)$ and $Y_2(e^{j\Omega_\mu},k)$ is minimized.

15. The computer program product according to claim 12, wherein the first filter and the second filter are adapted by means of the Normalized Least Mean Square algorithm and depending on an estimate for the power density of background noise $\hat{S}_{bb}(\Omega_\mu,k)$ weighted by a frequency-dependent parameter.

16. The computer program product according to claim 12, wherein the coherence is estimated by calculating the short-time coherence of the first and second filtered signals $Y_1(e^{j\Omega_\mu},k)$ and $Y_2(e^{j\Omega_\mu},k)$.

17. The computer program product according to claim 16, wherein the computer code for calculating the short-time coherence comprises computer code for calculating the power density spectrum of the first filtered signal $Y_1(e^{j\Omega_\mu},k)$, the power density spectrum of the second filtered signal $Y_2(e^{j\Omega_\mu},k)$ and the cross-power density spectrum of the first and the second filtered signals $Y_1(e^{j\Omega_\mu},k)$ and $Y_2(e^{j\Omega_\mu},k)$ and temporarily smoothing each of these power density spectra.

18. The computer program product according to claim 17, further comprising computer code for determining either the signal-to-noise ratio of first filtered signal $Y_1(e^{j\Omega_\mu},k)$ and/or the second filtered signal $Y_2(e^{j\Omega_\mu},k)$; or of the first microphone signal $x_1(t)$ and/or the second microphone signal $x_2(t)$; and wherein the temporal smoothing of each of the power density spectra is performed based on a smoothing parameter that depends on the determined signal-to-noise ratio.

19. The computer program product according to claim 16, further comprising:

computer code for smoothing the short-time coherence in frequency to estimate the coherence.

20. The computer program product according to claims 16, further comprising:

computer code for subtracting a background short-time coherence from the calculated short-time coherence to estimate the coherence.

21. The computer program product according to claim 20, further comprising:

computer code for temporarily smoothing the short-time coherence and wherein the background short-time coherence is determined from the temporarily smoothed short-time coherence by minimum tracking.

22. The computer program product according to claim 16, comprising:

computer code for detecting sound generated by a first sound source and a different sound generated by a second source by the first and the second microphones wherein the first microphone is positioned closer to the first sound source than the second microphone and the second microphone is positioned closer to the second sound source than the first microphone;

computer code associating the first and the second adaptive filters with the first sound source;

computer code for associating another first and second adaptive filters with the second sound source;

computer code for determining the signal-to-noise ratio of the first and the second microphone signals $x_1(n)$ and $x_2(n)$;

computer code for adapting the first and second adaptive filters associated with the first sound source without adapting the first and second adaptive filters associated with second sound source, if the signal-to-noise ratio of the first microphone signal exceeds a predetermined threshold and exceeds the signal-to-noise ratio of the second microphone signal by some predetermined factor; and computer code for adapting the first and second adaptive filters associated with the second sound source without adapting the first and second adaptive filters associated with first sound source, if the signal-to-noise ratio of the second microphone signal exceeds a predetermined threshold and exceeds the signal-to-noise ratio of the first microphone signal by some predetermined factor.

23. A signal processing system, comprising a first adaptive Finite Impulse Response filter, configured to filter a first microphone signal to obtain a first filtered signal;

a second adaptive Finite Impulse Response filter, configured to filter a second microphone signal to obtain a second filtered signal; and coherence calculation circuitry configured to estimate the coherence of the first filtered signal and the second filtered signal; wherein the first and the second adaptive filters are configured to filter the first and the second microphone signals such that the difference between the acoustic transfer function for the transfer of the sound from a sound source to the first microphone and the transfer of the sound from the sound source to the second microphone is compensated in the first and second filtered signals.

24. The signal processing system according to claim 23, wherein the coherence calculation logic is configured to calculate the short-time coherence of the first and second filtered signals $Y_1(e^{j\Omega_\mu},k)$ and $Y_2(e^{j\Omega_\mu}, k)$ and wherein the first and second filters are configured to be adapted by means of the Normalized Least Mean Square algorithm and depending on an estimate for the power density of background noise $\hat{S}_{bb}(\Omega_\mu,k)$ weighted by a frequency-dependent parameter.

25. The signal processing system according to claim 23, wherein the first filter and the second filter are configured such that an average power density of the error signal $E(e^{j\Omega_\mu},k)$ defined as the difference of the first and second filtered signals is minimized.

26. Hands-free speech communication device, in particular, a hands-free telephony set and more particularly suitable for installation in a vehicle compartment, comprising the signal processing system according to claim 23.

* * * * *